United States Patent
Ohnishi et al.

(10) Patent No.: US 6,721,242 B2
(45) Date of Patent: Apr. 13, 2004

(54) OPTICAL DETECTOR HAVING THREE LIGHT RECEIVING AREAS

(75) Inventors: Kunikazu Ohnishi, Yokosuka (JP); Takeshi Shimano, Tokorozawa (JP); Shigeru Nakamura, Tachikawa (JP); Masayuki Inoue, Yokohama (JP); Yukio Fukui, Machida (JP); Yasuyuki Sugi, Ibaraki (JP); Shinji Fujita, Yokohama (JP); Mitsuhiko Ota, Yokohama (JP)

(73) Assignees: Hitachi, Ltd., Tokyo (JP); Hitachi Media Electronics Co., Ltd., Mizusawa (JP)

( * ) Notice: Subject to any disclaimer, the term of this patent is extended or adjusted under 35 U.S.C. 154(b) by 0 days.

(21) Appl. No.: 10/142,896

(22) Filed: May 13, 2002

(65) Prior Publication Data

US 2002/0141301 A1 Oct. 3, 2002

Related U.S. Application Data

(63) Continuation of application No. 09/347,530, filed on Jul. 6, 1999, now Pat. No. 6,507,009.

(30) Foreign Application Priority Data

Jul. 3, 1998 (JP) .......................................... P10-188509

(51) Int. Cl.[7] ............................................. G11B 7/095
(52) U.S. Cl. ................................ 369/44.26; 369/44.29; 369/44.37; 369/44.41; 369/120; 369/53.2
(58) Field of Search .......................... 369/44.26, 44.29, 369/44.37, 44.41, 53.2, 53.22, 120; 250/201.2, 201.5

(56) References Cited

U.S. PATENT DOCUMENTS

| | | | | |
|---|---|---|---|---|
| 5,235,584 A | * | 8/1993 | Yoshio et al. | 369/44.29 |
| 5,363,365 A | * | 11/1994 | Ajima | 369/124.09 |
| 5,412,630 A | * | 5/1995 | Deguchi et al. | 369/44.32 |
| 5,453,962 A | * | 9/1995 | Fujita et al. | 369/44.23 |
| 5,650,987 A | | 7/1997 | Kadowaki | |
| 5,696,749 A | * | 12/1997 | Brazas et al. | 369/112.09 |
| 5,802,029 A | * | 9/1998 | Zucker | 369/44.29 |
| 5,808,993 A | * | 9/1998 | Lee | 369/53.23 |
| 5,875,164 A | * | 2/1999 | Yamakawa et al. | 369/44.29 |
| 5,959,955 A | * | 9/1999 | Choi | 369/53.23 |
| 6,222,803 B1 | * | 4/2001 | Uemura et al. | 369/44.29 |
| 6,243,341 B1 | * | 6/2001 | Hasimoto | 369/53.22 |
| 6,507,009 B1 | * | 1/2003 | Ohnish et al. | 250/201.2 |

FOREIGN PATENT DOCUMENTS

JP     4-168631     6/1992

OTHER PUBLICATIONS

"A New Tracking Servo Method Differential Push–Pull Method", by K. Ohsao, 1986, pp. 127–132.

* cited by examiner

*Primary Examiner*—W. R. Young
(74) *Attorney, Agent, or Firm*—Antonelli, Terry, Stout & Kraus, LLP

(57) ABSTRACT

An optical detector for detecting at least three optical beams reflected by an optical information recording medium and outputting an electric signal, the optical detector having three light receiving areas each of which receives a respective one of the three optical beams and each of which has four light receiving surfaces, twelve signal lines to transmit an electric signal obtained on respective ones of the four light receiving surfaces of the three light receiving areas, selected ones of the twelve signal lines connected to the four light receiving surfaces of different ones of the three light receiving areas being joined together within the optical detector, and less than nine signal output lines formed by joining the selected ones of the twelve signal lines extend from the optical detector to a signal processing circuit.

18 Claims, 12 Drawing Sheets

Reflected light of optical spot 101
Reflected light of optical spot 100
Reflected light of optical spot 102

(a)　　(b)　　(c)

(a) Focusing error signal detected from reflected light of optical spot 100

(b) Focusing error signal detected from reflected lights of optical spots 101 and 102

(Opposite phase to the disturbance of signal A)

(c) Signal A + Signal B

Disturbance is canceled

Tracking error signal detected from reflected light of optical spot 100

Tracking error singnal detected from reflected lights of optical spots 101 and 102

Signal E - Signal F

Position of optical spots on DVD-ROM disk

Position of optical spots on DVD-RAM disk

Position of optical spots on CD, CD-ROM and CD-R disks

OPTICAL DETECTOR HAVING THREE LIGHT RECEIVING AREAS

CROSS REFERENCE TO RELATED APPLICATION

This is a continuation of U.S. application Ser. No. 09/347,530, filed Jul. 6, 1999, now U.S. Pat. No. 6,507,009, the subject matter of which is incorporated by reference herein.

BACKGROUND OF THE INVENTION

The present invention is concerned with an optical information reproducing apparatus ('optical disk apparatus') that is used to reproduce a data signal recorded in an optical information recording medium ('optical disk'). Especially, the present invention is used to increase the performance in detecting various error signals which are used to control the position of an optical spot in an apparatus for reproducing information from an optical disk.

A knife edge detection method (Foucault detection method), beam size detection method, astigmatic detection method, etc. are conventionally used as methods to detect a focusing error signal in an optical disk apparatus. From various points of view, such as the simplicity of the optical system, the ease of adjustment thereof and the ease of combining such detection method with a detection method for a tracking error signal, etc., the astigmatic detection method has had the greatest general acceptance. However, the astigmatic detection method has an important problem in that, when an optical spot irradiated on the optical disk deviates from the record track of a disk, a disturbance may easily occur in the focusing error signal. The influence of this disturbance especially notably occurs when reproducing a disk having a land-groove structure such as a DVD-RAM disk, etc., of a type that is planned to be manufactured soon. The main reason why such a disturbance especially occurs on a disk having a land-groove structure is that the amplitude of the so-called push-pull signal produced by diffraction in a groove of the disk becomes enlarged because the width of the groove and the distance between grooves are almost equal on the optical disk having a land-groove structure, and the depth of the groove is set at $\frac{1}{6} \sim \frac{1}{7}$ relative to the wavelength of the laser light used for reproduction (650 NM).

Conventionally, a method of shading the center part of a detection light beam (The Japanese patent Laid-open print No. 4-314500 official gazette) and a method of reducing a disturbance by a rotary adjustment of an objective lens (Japanese patent publication No. 5-68774 official gazette), etc. have been disclosed as a means to reduce the disturbance in the focusing error signal produced by an astigmatic detection method. However, in actual practice, the disturbance is sufficiently reduced by neither method. Therefore, in an optical disk apparatus for the DVD-RAM disk of the type mentioned above, it has been necessary to use a knife edge method and a beam size method conventionally, although the structure and coordinates of an optical system according to these methods are complex.

On the other hand, the three spot detection method and the push-pull method are representative methods which have been used for detecting a tracking error signal in an optical disk apparatus. The three spot detection method is widely used for conventional read-only disks, such as the CD and CD-ROM disks, from the point of view simplicity, ease of adjustment, and the resistance against production of a disturbance, etc., of an optical system. Optical disk apparatuses which are used to reproduce mass read-only disks, such as a DVD-ROM disk, widely use a differential phase detection method instead of the three spot detection method because (1) the sensitivity of a tracking error signal is not sufficiently obtained in DVD due to the influence of a narrow small record track pitch and (2) the precision of a relative position adjustment of the three optical spots that are irradiated on the disk in DVD must be remarkably finer than that of a CD. The differential phase detection method detects a tracking error signal in accordance with a time change of intensity distribution of the reflected light of one optical spot.

An optical disk apparatus cannot be used for reproducing recordable disks, such as DVD-RAM disks, because of the problem of offset resulting from the difference between the reflection light quantities of the forward subspot and that of a backward subspot. Thus, a push-pull method, that is another representative method for detecting a tracking error signal, is generally used in the optical disk apparatus for reproducing recordable disks.

Now, though the push-pull method has an excellent advantage in that a highly-sensitive tracking error signal is obtained by a relatively simple optical system, it also produces an important problem in that a large offset arises in the tracking error signal when an objective lens is displaced in the tracking direction. Thus, a so-called differential push-pull method has been proposed as a valid method for greatly reducing the offset of a tracking error signal resulting from objective lens displacement (Optical memory symposium '86 treatise collection (1986) PP. 127–132). This differential push-pull method irradiates an optical disk with three optical spots similar to the three spot detection method. However, this method cancels the offset caused by an objective lens displacement by performing specified subtraction processing on a tracking error signal detected by a push-pull method for each optical spot.

SUMMARY OF THE INVENTION

In actual practice, the most suitable methods for detecting a tracking error signal for each kind of optical disk are quite different. However, some of these optical disks have already experienced wide use and others are certain to become popular in the future. Therefore, for an optical disk apparatus, it is naturally desirable for all of these optical disks to be reproducible by a single apparatus. However, as mentioned above, there currently are unavoidable problems in that there is not a means of simple structure that can obtain a good focusing error signal that is not subject to the influence of a disturbance, and in that the structure of an optical head and the internal structure of an optical detector become very massively complex if designed to incorporate various tracking error signal detection means in one optical disk apparatus. That is, a quite new optical means is necessary to realize a useful optical disk apparatus that has a simple optical head or an optical detector with simple structure, and which can obtain a good focusing error signal that is not subject to the influence of a disturbance, and can realize all of the above-mentioned means for tracking error signal detection.

Considering the above situation, it is an object of the present invention to provide a new optical head that can greatly reduce the influence of a disturbance of the type that typically occurs when using an astigmatic detection method as a focusing error signal detection means with one simple detection optical system and a simple structured optical detector, and which can greatly reduce the influence of an offset that occurs because of displacement of an objective lens which results when using a push-pull method as a tracking error signal detection method.

Another object of this invention is to provide an optical detector and a signal processing circuit to realize the above-mentioned optical head.

A further object of present invention is to provide a useful optical disk apparatus that contains the above-mentioned optical head and which can reproduce information from various optical disks by selectively changing the focusing error signal detection method and tracking error signal detection method according to the kind of disk to be reproduced so as to use the most suitable method for each disk. To attain the foregoing objects, the present invention provides the following features.

An optical detector for detecting at least three optical beams reflected by an optical information recording medium and for outputting an electric signal, said optical detector comprising:

three light receiving areas each of which receives one optical beam of said three optical beams and each of which has four light receiving surfaces;

twelve signal lines to transmit an electric signal obtained on each of said four light receiving surfaces in said three light receiving areas;

less than nine signal output lines formed by connecting specified signal lines of said twelve signal lines and which extend to the outside of said optical detector.

A signal processing circuit which produces a focus error signal and a tracking error signal for optical spots irradiated on an optical information recording medium, and which reproduces a data signal recorded in said optical information recording medium by using an electric signal output from an optical detector detecting at least three optical beams reflected by the optical information recording media, said signal processing circuit comprising: means for adding or subtracting focusing error signals from each of three spots irradiated on said optical information recording medium by an astigmatic detection method and a tracking error signal for each of three spots irradiated on said optical information recording medium by a push-pull method; and means for outputting signals produced by said adding or subtracting.

An optical information reproducing apparatus comprising a semiconductor laser, an optical dividing element that divides an optical beam that is emitted from the semiconductor laser into at least three optical beams, an optical system that converges each of the three optical beams and irradiates optical spots of three optical beams at a prescribed position on the optical information recording medium, an optical detector which receives three optical beams that are reflected by said optical information recording medium and which outputs electric signals, a control circuit judging a kind of said optical information recording medium, and a signal processing circuit for producing and outputting a focus error signal and a tracking error signal for optical spots irradiated on the optical information recording medium by changing selectively a prescribed focus error signal detecting method and a tracking error signal detecting method according to the kind of said optical information recording method which is judged by said control circuit, and for reproducing a data signal recorded in said optical information recording medium.

DESCRIPTION OF THE EMBODIMENTS

Embodiments of the present invention will now be described with reference to the drawings.

Figure 1:
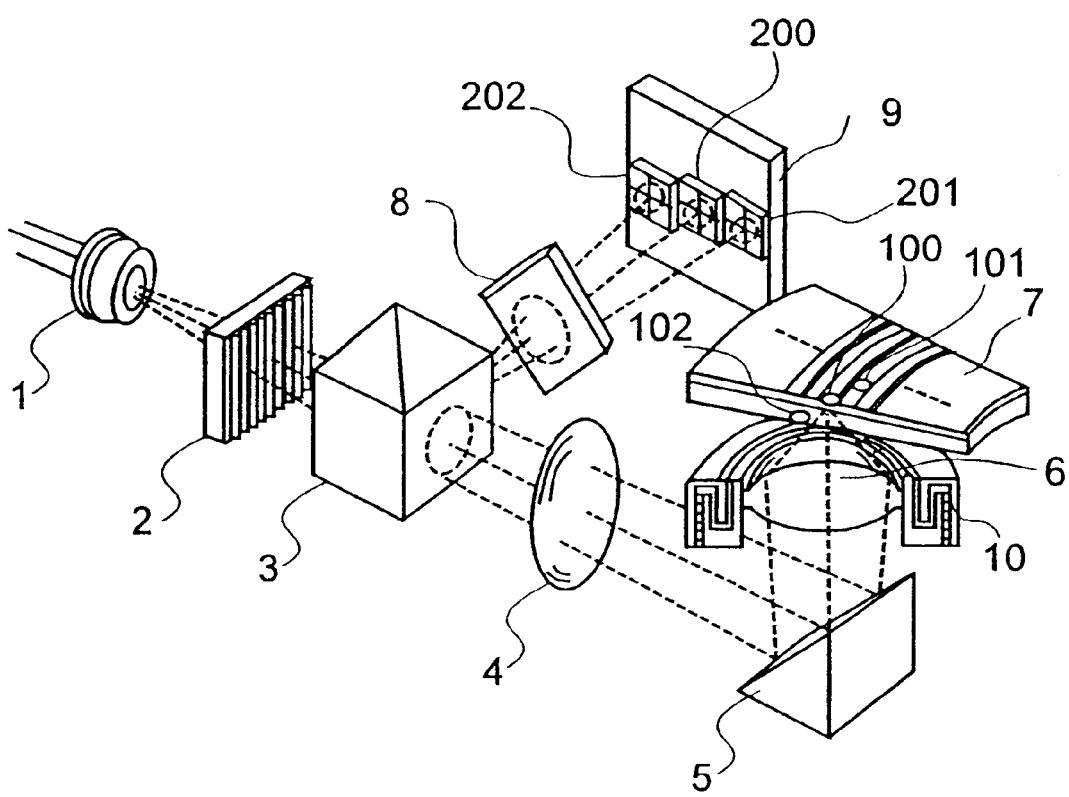
FIG. 1 is a perspective view showing an optical head used in a first example of the present invention.

FIG. 1 is the perspective view that shows the structure of the optical system of an optical head that is the principal part of the optical disk apparatus of the present invention. Semiconductor laser light source 1 is, for example, an element that emits laser flux at a wavelength of 650 NM. The optical beams that emanate from semiconductor laser light source 1 pass into a diffraction grating 2. The laser optical beam is separated into at least three optical beams, including 0 order light that will pass through the diffraction grating 2, and ±1st order diffraction light that emerges at a specified diffraction angle relative to the 0 order light. The three optical beams pass into the collimate lens 4 via cubic beam splitter 3. After being converted into parallel optical beams in the collimate lens 4, the three optical beams are irradiated as optical spots 100, 101 and 102 on the recording surface of an optical disk 7, such as for example, a DVD-RAM disk or a DVD-ROM disk, via start mirror 5 and objective lens 6. The three optical beams are reflected by the optical disk 7 and are reflected by the reflection face of the beam splitter 3 via objective lens 6, start mirror 5 and collimate lens 4 and are irradiated on a respective light receiving area of an optical detector 9 via cylindrical lens 8.

As shown in FIG. 1, the optical detector 9 has three light receiving areas (200, 201 and 202) almost linearly located and each light receiving area is divided into four parts by two orthogonal lines. Therefore, the optical detector has twelve light receiving faces in all. The 0 order light beam and ±1st order diffraction light beams that are reflected by optical disk 7 are irradiated almost at the center of the three light receiving areas (200, 201 and 202), respectively. The center is the position at the crossing point of the vertical line and the horizontal line on each light receiving area, which corresponds to the center of the intensity of the light. At this time, because each optical beam is given a specified astigmatism through cylindrical lens 8, a focusing error signal is detected by an astigmatic detection method from each light receiving area, as will be described later. Also, a tracking error signal can be detected at each light receiving area by a push-pull method. A detailed explanation of the astigmatic detection method and the push-pull method will be omitted here because these methods are already common knowledge.

The objective lens 6 is fitted with a two-dimensional actuator 10. The two-dimensional actuator 10 automatically controls the position of an objective lens using a specified focusing error signal and a tracking error signal obtained from the optical detector 9 to cause the optical spots 100, 101 and 102 to be irradiated on a prescribed position of the record track correctly.

Figure 2:
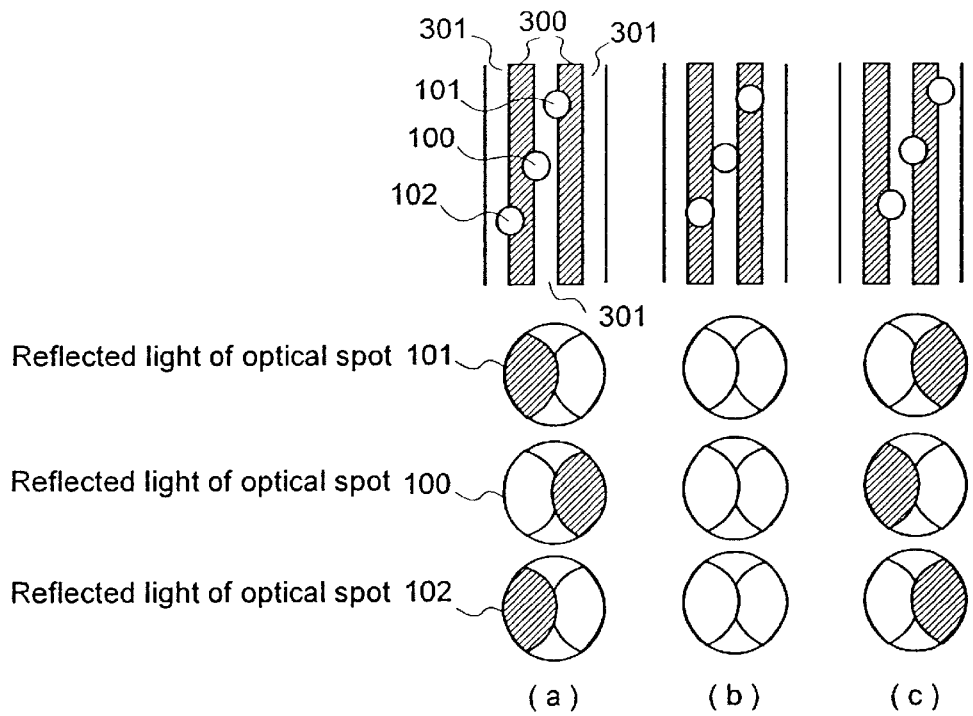
FIG. 2 is a diagram showing the positional relation of optical spots and the condition of reflected light irradiated on a DVD-RAM disk.

In this example, the distance in the disk radius direction among irradiated optical spots 100, 101 and 102 on the optical disk 7 is set to be almost half of the groove pitch of the DVD-RAM disk. As shown in FIG. 2 at diagram (b), for example, in case the optical spot 100 of the 0 order light beam is irradiated precisely on the area 301 between the grooves, optical spots 101 and 102 of the ±1st order diffraction light beams will be irradiated precisely on the grooves which are next to the area 301. The relative position among the three optical spots is always maintained, as is shown in FIG. 2 at diagrams (a) and (c), even when the optical spot of the 0 order light beam relatively deviates relative to a groove. The reflected light is influenced by diffraction in a groove and its intensity distribution forms a peculiar pattern which periodically changes according to a change in the relative position between a groove and an optical spot. FIG. 2 shows such change in which the forms of the reflected light of the optical spot 101 and that of the optical spot 102 are reversed on the right and left perfectly relative to that of the optical spot 100.

Figure 3:
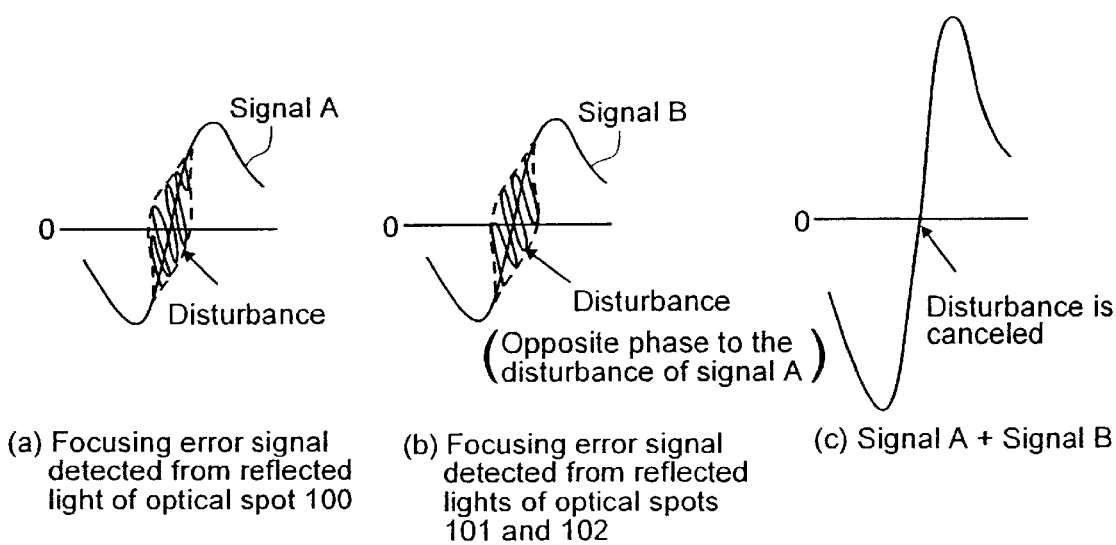
FIG. 3 is a diagram showing a disturbance reduction effect of a focusing error signal.

As mentioned above, there is an important problem in that big disturbances easily occur in the focusing error signal obtained from the reflected light detected by the astigmatic detection method. This is mainly why the intensity distribution of reflected light forms a peculiar pattern by diffraction in a groove as mentioned above and a feedthrough signal from the tracks. Therefore, as shown in FIG. 3, the focusing error signal from optical spot 100 (diagram (a)) and that from optical spots 101 and 102 (diagram (b)) have the same waveform, but the phases of the disturbance in the signals are almost perfectly reversed relative to each other. Therefore, by adding a focusing error signal from optical spot 100 to a focusing error signal from optical spot 101 or 102, a good focusing error signal in which the disturbance is almost perfectly deleted (while the amplitude is double) is obtained, as shown in FIG. 3 at diagram (c). A good focusing error signal can be obtained by adding a focusing error signal for optical spot 100 to the sum of the focusing error signals of optical spots 101 and 102.

Figure 4A:
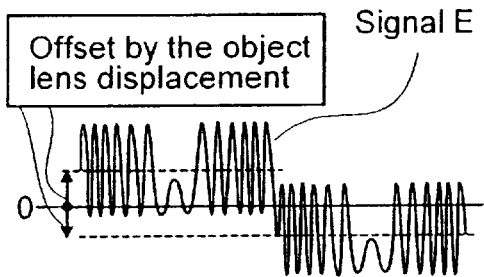
FIGS. 4(a) to 4(c) are diagrams showing an offset reduction effect of a tracking error signal.
Figure 4B:
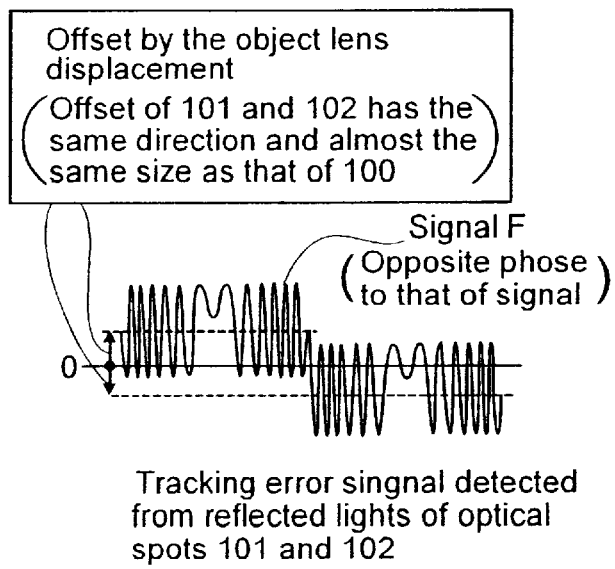
Figure 4C:
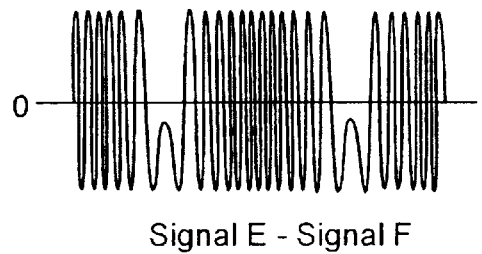

The phenomenon described above also similarly applies to detection of a tracking error signal by the push-pull method. That is, when detecting a tracking error signal by the push-pull method, the irradiated optical spot on the light receiving face is generally displaced by a displacement of an objective lens in the tracking direction and the detected tracking error signal comes to have a large offset as shown in FIGS. 4 (a) and 4(b). All offsets in the tracking signal from optical spots 100, 101 and 102 have the same directions and almost the same size as shown in FIGS. 4(a) and 4(b). The phase of the tracking error signal from optical spots 101 and 102 are perfectly reversed relative to that of the optical spot 100 for the same reason as the focusing error signal mentioned above. Therefore, by subtracting one of the tracking error signals of optical spots 100, 101 and 102 from the tracking error signal of another optical spot, a good tracking error signal in which the offset is almost perfectly deleted can be obtained.

This invention produces a good focusing error signal and tracking error signal by using the above-mentioned principle.

Figure 5:
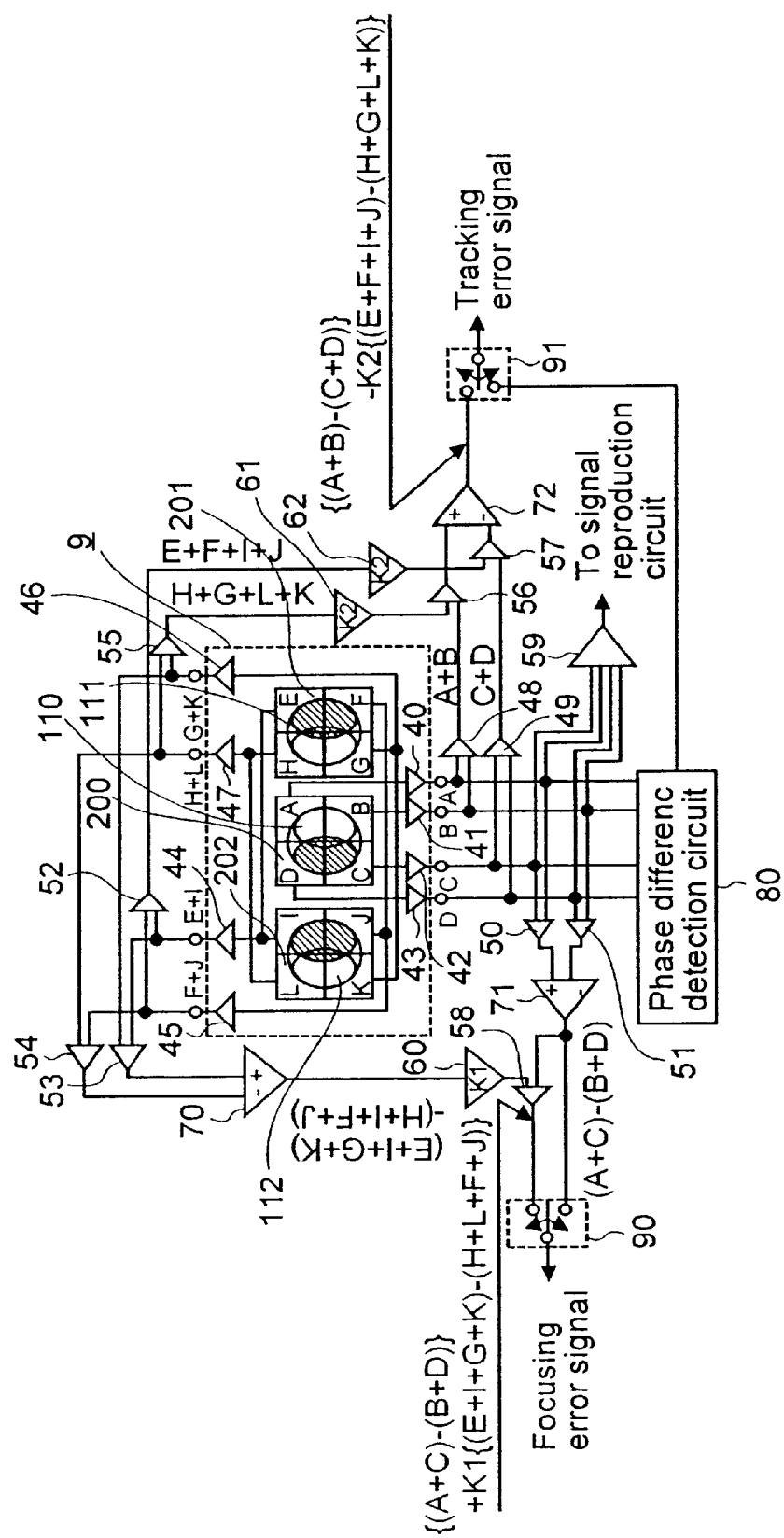
FIG. 5 is a schematic diagram showing an optical detector and signal processing circuit of the first example.

FIG. 5 is a block diagram showing a first example of this invention involving an optical detector and a signal processing circuit.

The optical detector 9 has three light receiving areas (200, 201 and 202) almost linearly located and each light receiving area is divided into four parts, that is, area 200 has sub-areas A, B, C, D, area 201 has sub-areas E, F, G, H, and area 202 has sub-areas I, J, K, L as shown in FIG. 5. The reflected light of optical spots 100, 101 and 102 is irradiated on the respective light receiving areas 200, 201 and 202, and detected light spots 110, 111 and 112 are formed.

First, each photo-electric current transformed and detected in each light receiving sub-area A, B, C and D is converted into a voltage by current-voltage conversion amplifiers (I –V AMP.) 40, 41, 42 and 43 in the optical detector 9, and each voltage is sent to an output terminal of the optical detector 9. The output line of light receiving sub-area E is connected with that of light receiving sub-area I and is connected to electric current-voltage conversion amplifier 44. Therefore, the electric current detected in light receiving sub-area E and the electric current detected in light receiving sub-area I are added and converted into a voltage by current-voltage conversion amplifier 44 and are sent to an output terminal. Likewise, the electric currents detected in the light receiving sub-areas F and J are added, the electric currents detected in sub-areas G and K and the electric currents detected in sub-areas H and L are respectively added. The results are converted into a voltage by current-voltage conversion amplifiers 45, 46 and 47, respectively, and are sent to an output terminal. To simplify the following explanation, the symbol(A, B. etc.) of the light receiving sub-areas also represents a signal which is detected at the light receiving sub-area and is converted into a voltage. Thus, signals A, B, C, D, E+I, F+J, G+K and H+L are output to each of eight output terminals of the optical detector 9.

An operation circuit will be explained next. A signal (A+C)–(B+D) is produced from the signals A, B, C and D that are output from optical detector 9 using adders 50 and 51 and a subtracter 71. Signals (A+B) and (C+D) are output through adders 48 and 49, respectively. Signal (A+C)–(B+D) serves as a focusing error signal for optical spot 100 using the astigmatic detection method. The signals (A+B) and (C+D) represent the quantity of light of detected optical spot 110 in each area into which the light receiving area 200 is divided in the tracking direction (radius direction) of the disk. The signal which represents the difference between (A+B) and (C+D) serves as the tracking error signal for optical spot 100 using a push-pull method.

A phase difference detection circuit 80 is connected to output signals A, B, C and D, and this circuit detects the tracking error signal from optical spot 100 using a differential phase detection method. A detailed explanation of the specific features of the differential phase detection method will be omitted here, because the method is already common knowledge.

On the other hand, signal (E+I+G+K)−(H+L+F+J) is produced by adders 53 and 54 and subtracter 70 from output signals E+I, F+J, G+K and H+L, and signal (E+I+G+K)−(H+L+F+J) is amplified at a specified amplification rate K1 by amplifier 60. The amplification rate K1 of amplifier 60 is set so that the amplitude of the signal (E+I+G+K)−(H+L+F+J) becomes almost the same as that of the signal (A+C)−(B+D). The signal (E+I+G+K)−(H+L+F+J) represents the sum of the focusing error signal for optical spots 101 and 102 detected by an astigmatic detection method.

The signals (E+F+I+J) and (H+G+L+K) are produced by adders 52 and 55 from output signals E+I, F+J, G+K and H+L, and the signal (E+I+G+K)−(H+L+F+J) produced by subtracter 60 is amplified at a specified amplification rate K1 by amplifier 60. Each signal (E+F+I+J) and (H+G+L+K) also is amplified at a specified amplification rate K2 by an amplifier 61 and 62. The amplification rate K2 of the amplifiers 61 and 62 is set so that the amplitude of each of the signals (E+F+I+J) and (H+G+L+K) becomes almost the same as that of the signals (A+B) and (C+D). Each of the signals (E+F+I+J) and (H+G+L+K) represents the sum of the quantity of light of detected optical spots 111 and 112 in the light receiving areas 201 and 202 in the tracking direction (radius direction) of the disk. The signal which represents the difference between (E+F+I+J) and (H+G+L+K) serves as the tracking error signal for optical spots 101 and 102 using a push-pull method. The signals (E+F+I+J) and (H+G+L+K) are amplified by amplifiers 61 and 62, are added to signals (A+B) and (C+D) by adders 56 and 57, respectively, and then, they are subtracted from each other with subtracter 72. Therefore, the signal that is output from subtracter 72 becomes {(A+B)−(C+D)}−K2·{(E+F+I+J)−(H+G+L+K)}. This signal is the signal which is obtained by subtracting the tracking error signal of spots 101 and 102 detected by light receiving areas 201 and 202 from that of spot 100 detected by light receiving area 200.

The terminal which outputs a focusing error signal and the terminal which outputs a tracking error signal of this signal processing circuit are provided with change switches 90 and 91, respectively. The change switches 90 and 91 are provided to suitably switch between the focusing error signal and the tracking error signal used for controlling actuator 10 according to the kind of disk, as will be described below.

Figure 6:
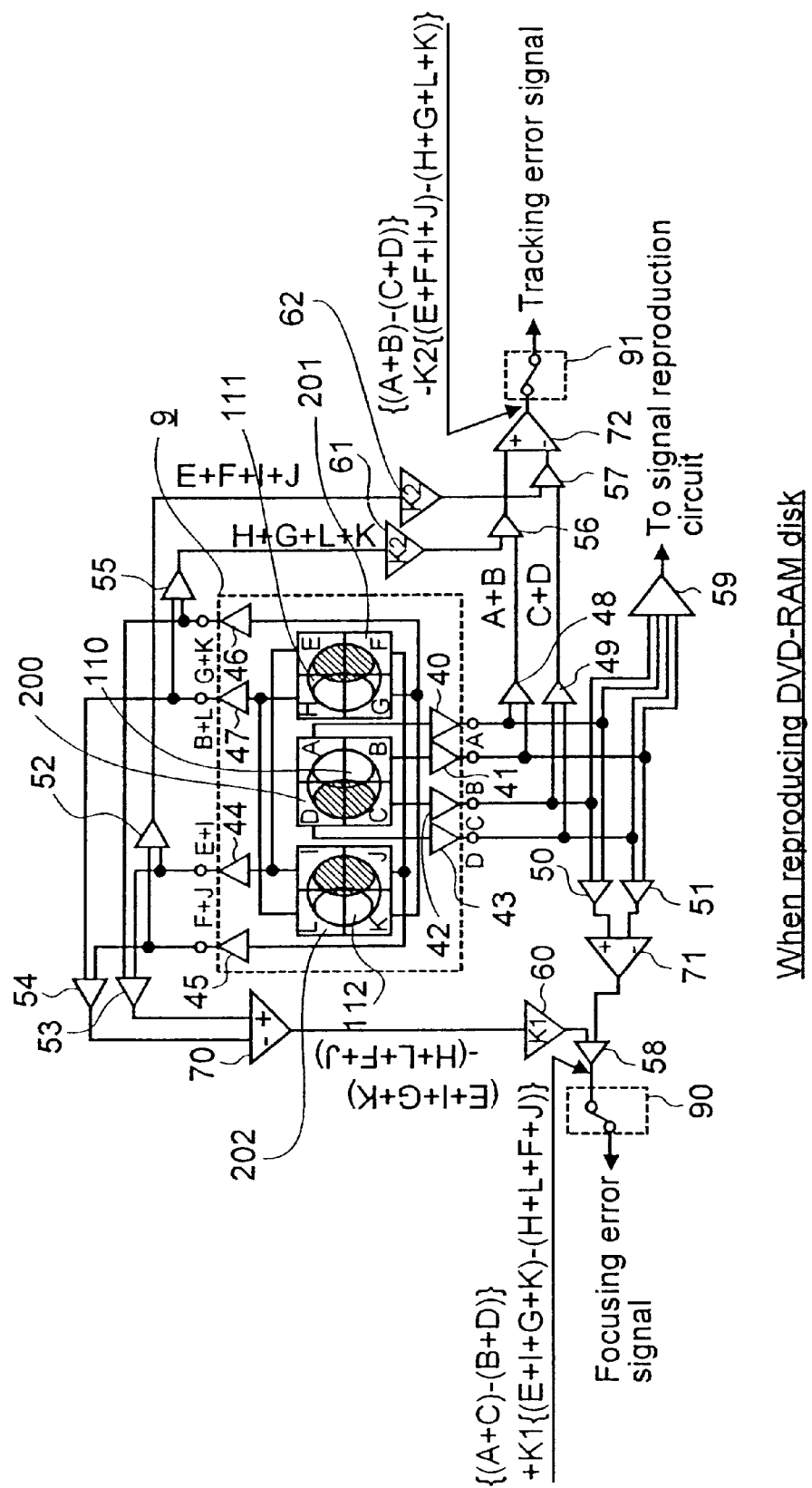
FIG. 6 is a schematic diagram showing an optical detector and signal processing circuit of the first example when reproducing an optical disk, such as a DVD-RAM disk, in which there is a continuous groove in the recording surface.

As shown in FIG. 6, when reproducing an optical disk, such as a DVD-RAM disk in which there is a continuous groove in the recording surface, first, by operating change switch 90, the signal {(A+C)−(B+D)}+K1·{(E+I+G+K)−(H+L+F+J)} is output as a focusing error signal. This is a signal which is obtained by adding the signal (A+C)−(B+D) output from subtracter 71 to signal K1·{(E+I+G+K)−(H+L+F+J)} output from amplifier 60 using adder 58; that is, this signal is obtained by adding the focusing error signal from optical spot 100 and the sum of the focusing error signal from optical spots 101 and 102 after adjusting the amplitude thereof by K1 as mentioned above. Therefore, this signal becomes a good focusing error signal without most disturbances typical of a focusing error signal caused by diffraction in the groove.

Then, by operating change switch 91, signal {(A+B)−(C+D)}−K2·{(E+F+I+J)−(H+G+L+K)} is output as a tracking error signal. This signal is, as mentioned above, the signal which is obtained by subtracting the tracking error signal of spots 101 and 102 detected by light receiving areas 201 and 202 from that of spot 100 detected by light receiving area 200. Therefore, while this signal is detected using a push-pull method, a good tracking error signal is obtained without most offsets caused by objective lens displacement.

On the other hand, when reproducing a read-only disk, such as a DVD-ROM disk and a CD on which there are phase pits corresponding to a recording signal, a disturbance does not arise in the focusing error signal even if the astigmatic detection method is used as a method for detecting the focusing error signal. And, a differential phase detection method using a tracking error signal output from phase difference detection circuit 80 can be used as a method of tracking error detection.

Figure 7:
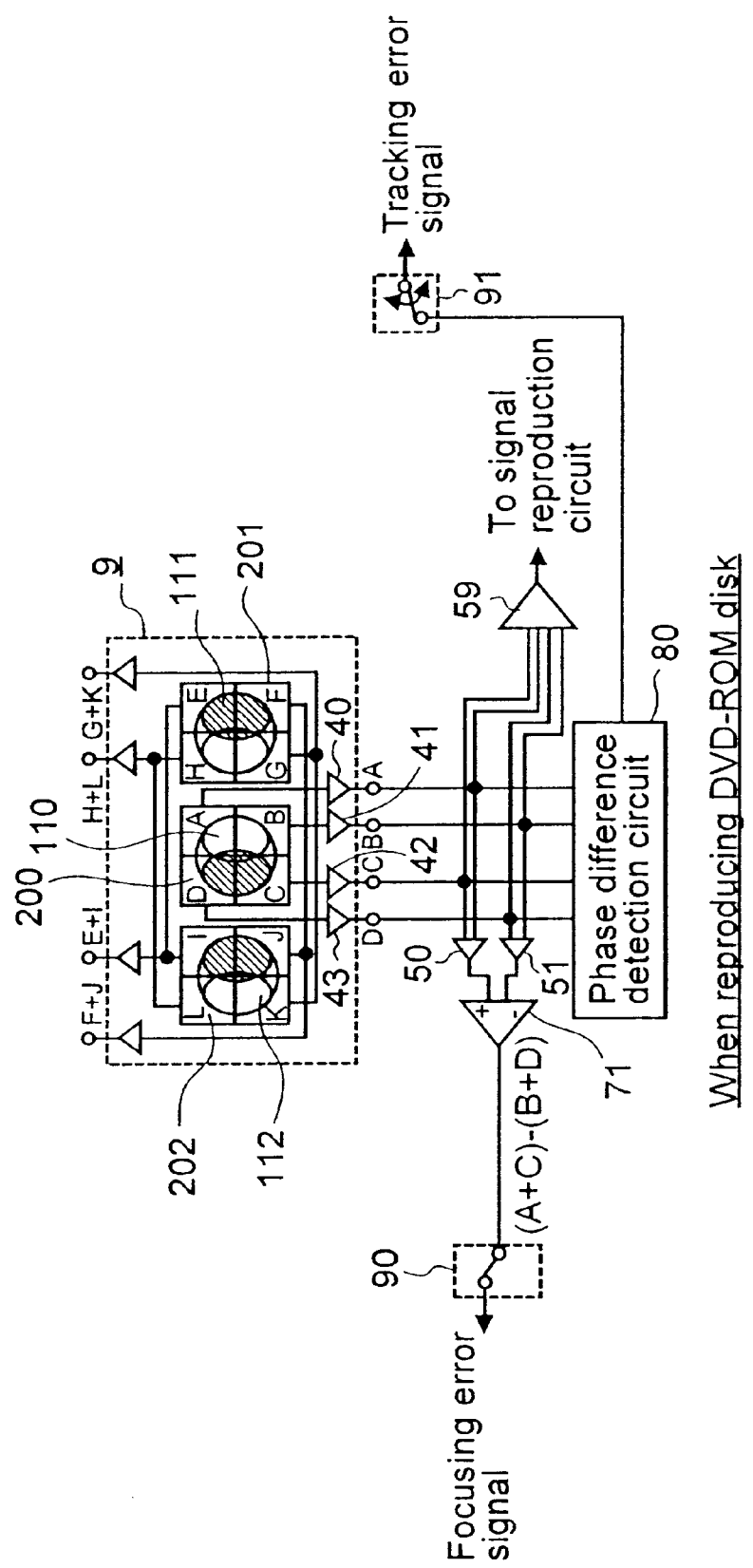
FIG. 7 is a schematic diagram showing an optical detector and signal processing circuit of the first example when reproducing a read-only disk, such as a DVD-ROM disk and a CD on which there are phase pits.

Then, as shown in FIG. 7, various error signals that are suitable for a read-only disk can be obtained by operating change switches 90 and 91, outputting signal (A+C)−(B+D) as a focusing error signal, and outputting a tracking error signal from the phase difference detection circuit 80 as a tracking error signal.

The focusing error signal and the tracking error signal obtained selectively as mentioned above according to the kind of optical disk are supplied to a specified actuator control circuit (not illustrated) and they are used to a drive two-dimensional actuator 10 and automatically control the position in the optical axis direction and the tracking direction of the objective lens 6.

Adder 59 generates the sum of output signals A, B, C and D and supplies it to a specified signal reproducing circuit (not illustrated). Then, the information signal recorded in the optical disk is reproduced. A detailed explanation of this signal reproducing circuit will be omitted here because it is already well-known. While it is not shown in this example, it is also possible for the package of the detector to have nine output terminal pins in total by incorporating the adder 59 in the package of optical detector 9 and adding an output terminal for the sum signal (A+B+C+D) to the detector 9.

In this example, by using the above-described optical detector and signal processing circuit, an output signal terminal can be restricted to 8 elements, and a useful package, for example a twelve pin package, for an optical detector can be realized, although the optical detector has twelve independent light receiving faces.

Figure 8:
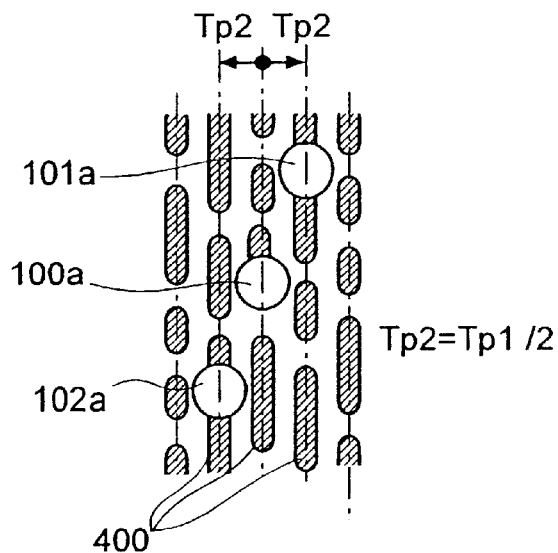
FIG. 8 is a diagram showing the positional relation of optical spots irradiated on a DVD-ROM disk.

The distance TP1 between the grooves on a DVD-RAM disk is double the track pitch TP2 on the DVD-ROM disk. (The track pitch of the DVD-ROM disk is 0.74 $\mu$M, and the distance between the grooves of the DVD-RAM disk is 1.48 $\mu$M.) Therefore, when the relative positions of the optical spots 100, 101 and 102 irradiated 17 on the DVD-RAM disk are as seen in FIG. 2, three optical spots are irradiated precisely on three adjacent record tracks on a DVD-ROM disk using one optical head, as seen in FIG. 8. In accordance with the present invention, as shown in FIG. 2, the reflected light of the three optical spots 100, 101 and 102, respectively, impinge on independent light receiving areas 200, 201 and 202. Thus, it is possible to reproduce an information signal recorded in three separate recording tracks simultaneously and independently using three optical spots. However, in this case, it is necessary at least that the structure of the optical detector 9 and a signal processing circuit is such that an independently reflected quantity of light is output for each of the optical spots 100, 101 and 102. For example, in FIG. 5 and FIG. 7, the sum of signals respectively detected by two specified light receiving sub-areas (E+I), (F+J), (G+K) and (H+L) are output from output terminals of optical detector 9. But, by outputting signals E, F, G, H, I, J, K and L independently and respectively without addition, by producing signals (E+F+G+H) and (I+J+K+L) from these signals with a specified adder, and by using the signals (E+F+G+H) and (I+J+K+L) with signal (A+B+C+D), the signals from three record tracks can be respectively reproduced simultaneously.

Information signals recorded in the several recording tracks on the DVD-RAM disk can be reproduced simultaneously using the same principle as a DVD-ROM disk. Because the DVD-RAM disk is of the land—groove recording type, an information signal recorded on a specified groove and an information signal recorded on lands (space between grooves) that are adjacent to both sides of the groove can be reproduced simultaneously by three optical spots. An information signal recorded on a specified land and an information signal recorded on grooves that are adjacent to both sides of the land can be reproduced likewise.

Figure 9:
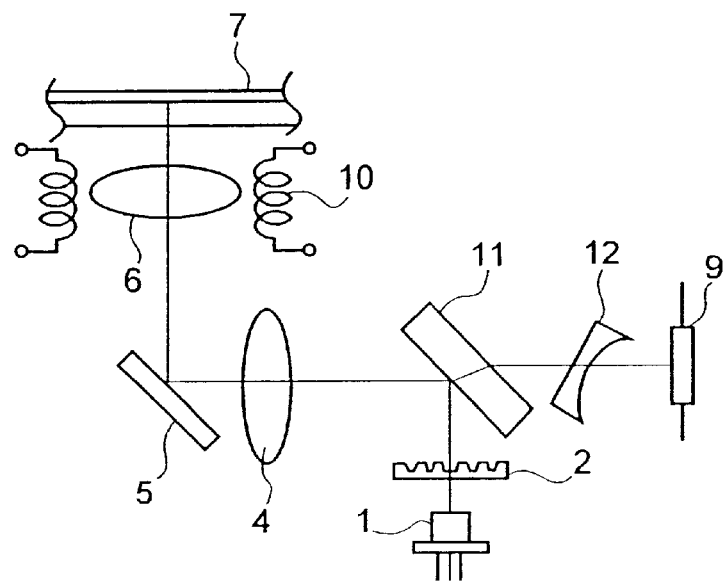
FIG. 9 is a diagram showing the structure of an optical head in a second example of the present invention.

Now, a second example of the present invention will be explained with reference to FIG. 9. FIG. 9 is a diagram of an optical system for an optical head that is the principal part of the optical disk apparatus of the present invention. In FIG. 9, the same numbers are used to identify the same parts as the example of FIG. 1.

A cubic beam splitter 3 and a cylindrical lens 8 to give the optical beam returned from the disk a specified astigmatism are used in the first example shown in FIG. 1 to separate the optical path of returned light that is reflected from the disk from that of light that is directed onto the optical disk. However, in the second example shown in FIG. 9, a flat half mirror 11 is used instead of the cubic beam splitter to separate the optical path of returned light from that of supplied light. The flat half mirror 11 has a specified thickness, and is set to be inclined almost 45 degrees relative to the optical axis. The laser optical beam that emanated from semiconductor laser 1 is reflected at half mirror 11 after passing through diffraction grating 2, is converted into parallel optical beams by collimate lens 4 and is directed onto the recording surface of optical disk 7 via start mirror 5 and objective lens 6. Reflected light from optical disk 7 is formed into a convergence optical beam via objective lens 6, start mirror 5 and collimate lens 4, and passes into half mirror 11. And then, it passes through the half mirror 11 and is directed onto optical detector 9 by concave lens 12. Because reflected light detected by a detector is given a specified astigmatism by being converged and transmitted through half mirror 11, which is inclined almost 45 degrees relative to the optical axis, a focusing error signal can be detected by an astigmatic detection method similar to the first example. However, in this case, the direction of the grooves in the diffraction grating 2 and the direction of the installed optical detector 9 need to be rotated by almost 45 degrees around the optical axis and the whole optical head needs to be rotated by almost 45 degrees around the axis of the light that impinges on the optical disk in the example shown in FIG. 1. And, the concave lens 12 provided after the half mirror 11 is set to be inclined at a prescribed angle to the opposite side relative to half mirror 11 to amend the coma aberration that occurs with astigmatism when the reflected light passes through the half mirror 11. A detailed explanation of the above-mentioned detection optics system will be omitted because it is the already a well-known part of the optical head for a CD, etc.

By using a simple optical head composed of a few parts, such as above-described, an optical disk apparatus similar to the first example of a present invention shown in FIG. 1 through FIG. 7 can be realized.

Figure 10:
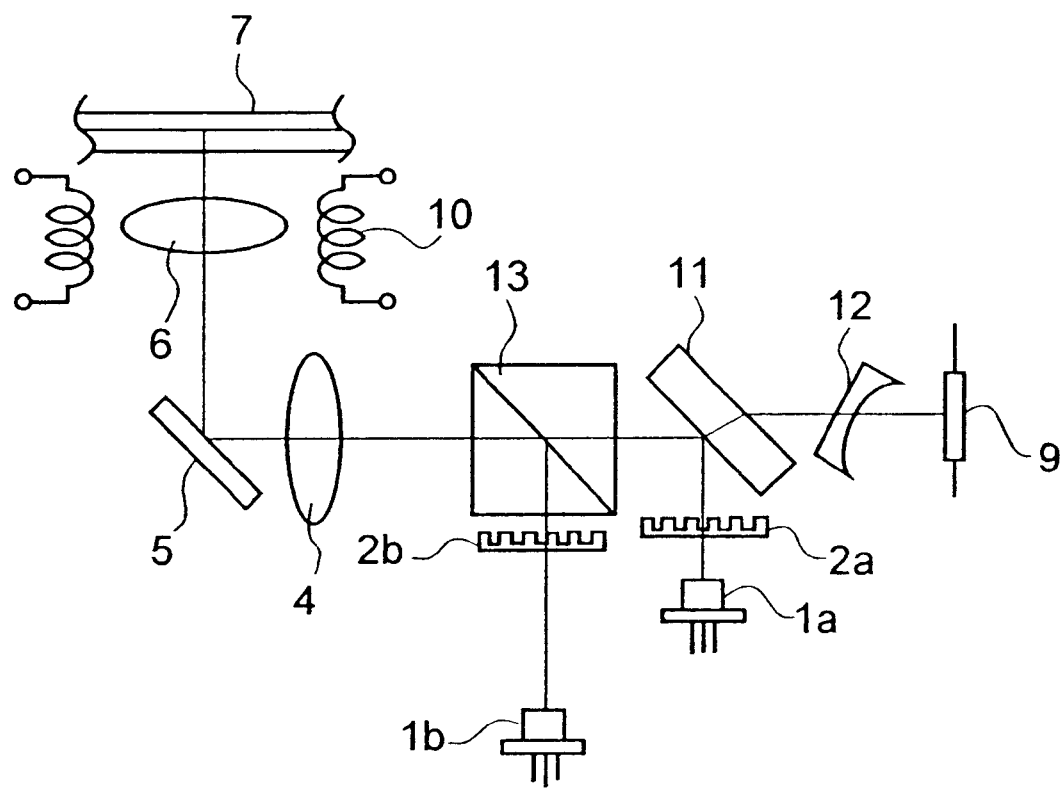
FIG. 10 is a diagram showing the structure of an optical head in a third example of the present invention.

A third example of the present invention will be explained with reference to FIG. 10. FIG. 10 is a diagram of an optical system of an optical head that forms the principal part of the optical disk apparatus of the present invention. In FIG. 10, the same numbers are used to identify the same parts as in the example of FIG. 1 and FIG. 2.

Figure 11A:
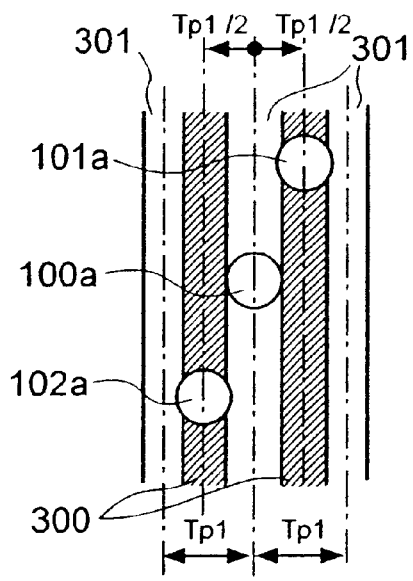
FIGS. 11(a) and 11(b) are diagrams showing the positional relation of optical spots irradiated on DVD-RAM disk and CD.

The optical head of this example employs in the head two semiconductor lasers whose oscillation wavelength is different and selects the semiconductor laser according to the kind of optical disk to be used. For example, semiconductor laser 1A emits a laser optical beam with a wavelength of 650 NM and is used for reproducing high density optical disks, such as the DVD-RAM and the DVD-ROM disk. Semiconductor laser 1B emits a laser optical beam with a wavelength of 780 NM and is used for reproducing conventional optical disks, such as the CD, CD-ROM and CD-R disks. Of course, it is also possible that laser 1A operates at a wavelength of 780 NM for CD and that laser 1B operates at a wavelength of 650 NM for DVD. When reproducing a DVD disk, the laser optical beam that is emitted from semiconductor laser light source 1A is separated into three optical beams by diffraction grating 2A, which beams pass into half mirror 11. Half mirror 11 is the optical element that has the reflectance and permeative rate characteristics that allow it to function as a half mirror for both of the optical beams that are emitted from semiconductor lasers 1A and 1B. On the other hand, the half mirror 11 may be an optical element that functions as a half mirror for the optical beam emitted from laser 1A and that is characterized by an almost 100% permeative rate for the optical beam emitted from laser 1B. Therefore, most of half the optical intensity of the optical beam that is emitted from laser 1A is reflected by half mirror 11 and passes into cubic beam splitter 13. Beam splitter 13 is the optical element that has reflectance and permeative rate characteristics that allow it to function as a half mirror for both of the optical beams that are emitted from semiconductor lasers 1A and 1B. Or, beam splitter 13 may be an optical element that is characterized by an almost 100% permeative rate for the optical beam emitted from laser 1A and that functions as a half mirror for the optical beam emitted from laser 1B. Therefore, all or part of the optical beam that is emitted from semiconductor laser IA and passes into the beam splitter 13 passes through the beam splitter 13 as it is and is irradiated on the recording surface of the optical disk 7 via collimate lens 4, start mirror 5 and objective lens 6. The distance in the tracking direction (disk radius direction) between three spots irradiated on the recording surface at this time is almost half of a groove pitch TP1, like optical spots 100A, 101A and 102A in FIG. 11(a). This is quite similar to the first and second example of the invention, as mentioned above. The light reflected by the optical disk 7 advances in a reverse direction on almost the same optical path as the applied light and reaches the half mirror 11. After that, almost half of the intensity of the reflected light passes through the half mirror 11 and is directed onto the optical detector 9 by the concave lens 12.

Figure 11B:
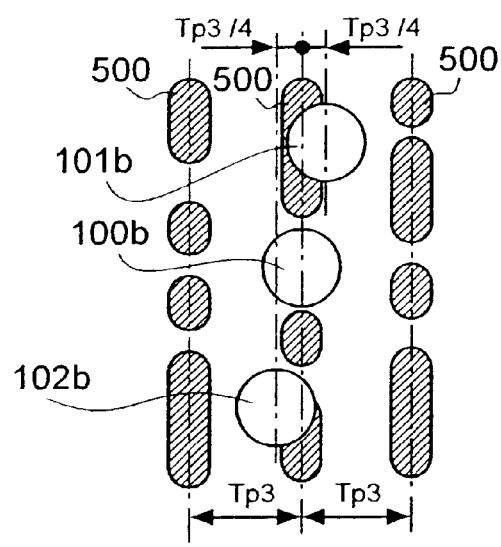

On the other hand, when reproducing a CD, semiconductor laser 1B is used as mentioned above. The optical beam emitted from laser 1B is separated into three optical beams by the diffraction grating 2B, passes into the beam splitter 13, and almost half the intensity of reflected light is reflected by the beam splitter 13 and is irradiated on the recording surface of optical disk 7 via collimate lens 4, start mirror 5 and objective lens 6. This objective lens 6 has both a function that causes an optical beam with a wavelength of 650 NM to irradiate excellently on the recording surface of the DVD disk, of which the disk substrate thickness is 0.6 NM, and a function that causes an optical beam with a wavelength of 780 NM to irradiate excellently on the recording surface of a CD, of which the disk substrate thickness is 1.2 NM. However, this objective lens does not need to be a special lens. For example, the following structure is also useful. Both an objective lens that is best designed for reproducing DVD disks and an objective lens that is best designed for reproducing CDs may be mounted in the same optical head, and by switching between objective lenses according to the kind of disk, any type of disk can be reproduced. When reproducing a CD, the distance in the tracking direction (disk radius direction) between three spots irradiated on the recording surface is almost a quarter of a groove pitch TP3 (1.6 μM) like optical spots 100B, 101B and 102B in FIG. 11(b). The light reflected by the optical disk 7 advances in a reverse direction on almost the same optical path as the applied light and passes into the beam splitter 13. After that, almost half the intensity of the reflected light passing into the beam splitter, via half mirror 11 and concave lens 12, impinges on the same optical detector 9 for detecting an optical beam from the semiconductor laser 1A.

Figure 12:
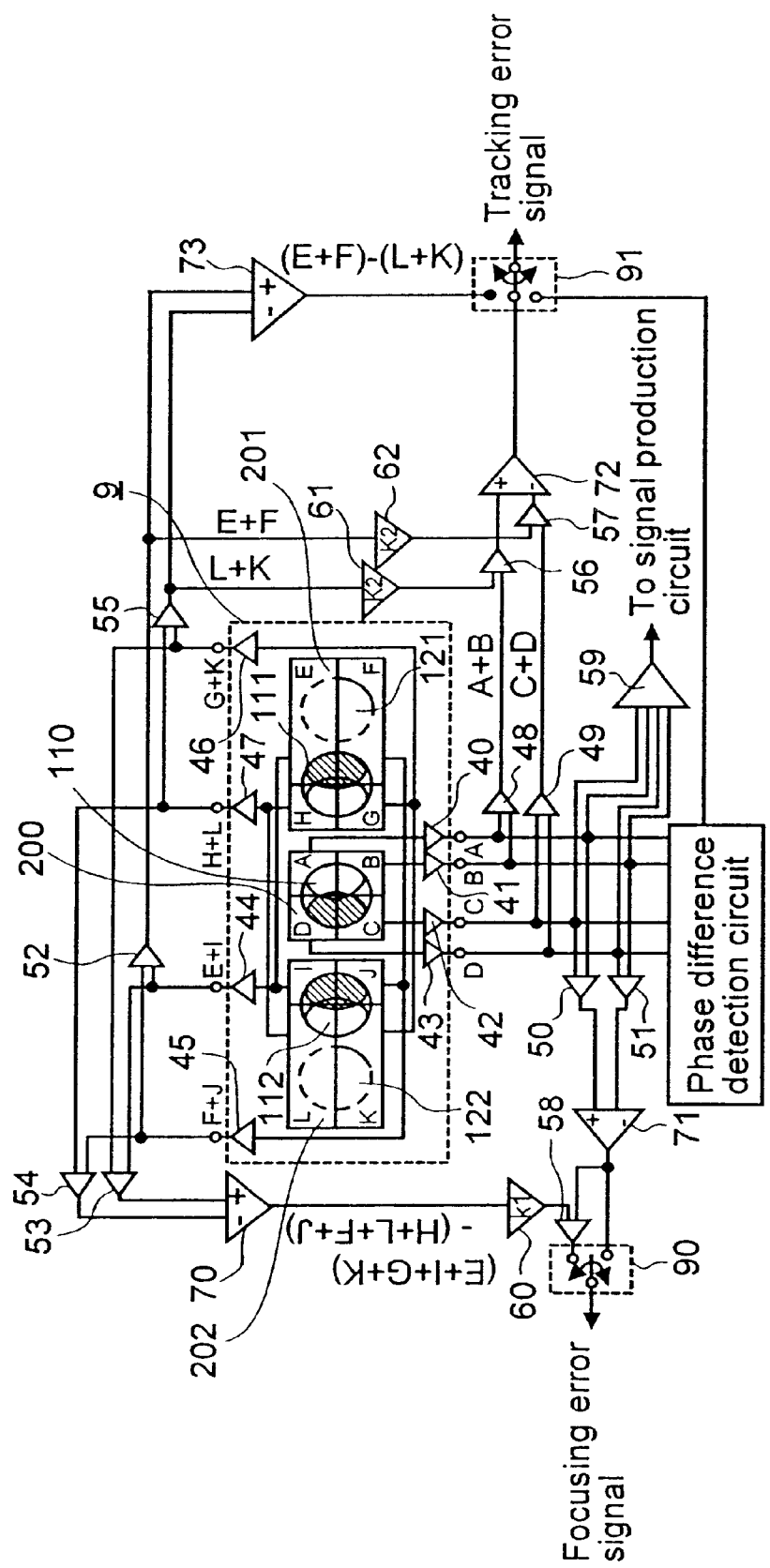
FIG. 12 is a schematic diagram showing an optical detector and signal processing circuit of the third example.

The structure of the optical detector 9 that is used in this example will be explained below with reference to FIG. 12. As referred to above, two optical spots of detection light having different wave lengths are irradiated in this example. The detection light spot detected on the light receiving face is changed according to the disk in the optical detector 9. While the basic structure of the detector is quite the same as the first example shown in FIG. 5, the shape of the light receiving areas of the light receiving sub-areas E, F, L and K are extended a little transversely, as shown in FIG. 12. When reproducing a DVD disk, the point at which the vertical line and the side line on each of the light receiving areas 200, 201 and 202 intersect almost coincides with the center of the intensity of the detected light spots 110, 111 and 112. When reproducing a CD, however, outside spots 121 and 122 of the three spots are irradiated respectively on an area displaced outwardly in light receiving areas 201 and 202. The area where the spots occur is close to sub-areas E and F of area 201 and sub-areas L and K of area 202 and is shown as optical spots 121 and 122 in broken line in FIG. 12. The central optical spot 120 is irradiated at the center of the light receiving area 200 similar to optical spot 100. Therefore, the distance between the detected light spots 121 and 122 on light receiving areas 201 and 202 is wider when reproducing a CD than the distance between detected light spots 111 and 112 on light receiving areas 201 and 202 when reproducing a DVD disk. As a result, detected light spots 121 and 122 are not irradiated on light receiving sub-areas H and G or light receiving sub-areas I and J when reproducing CD.

Figure 13:
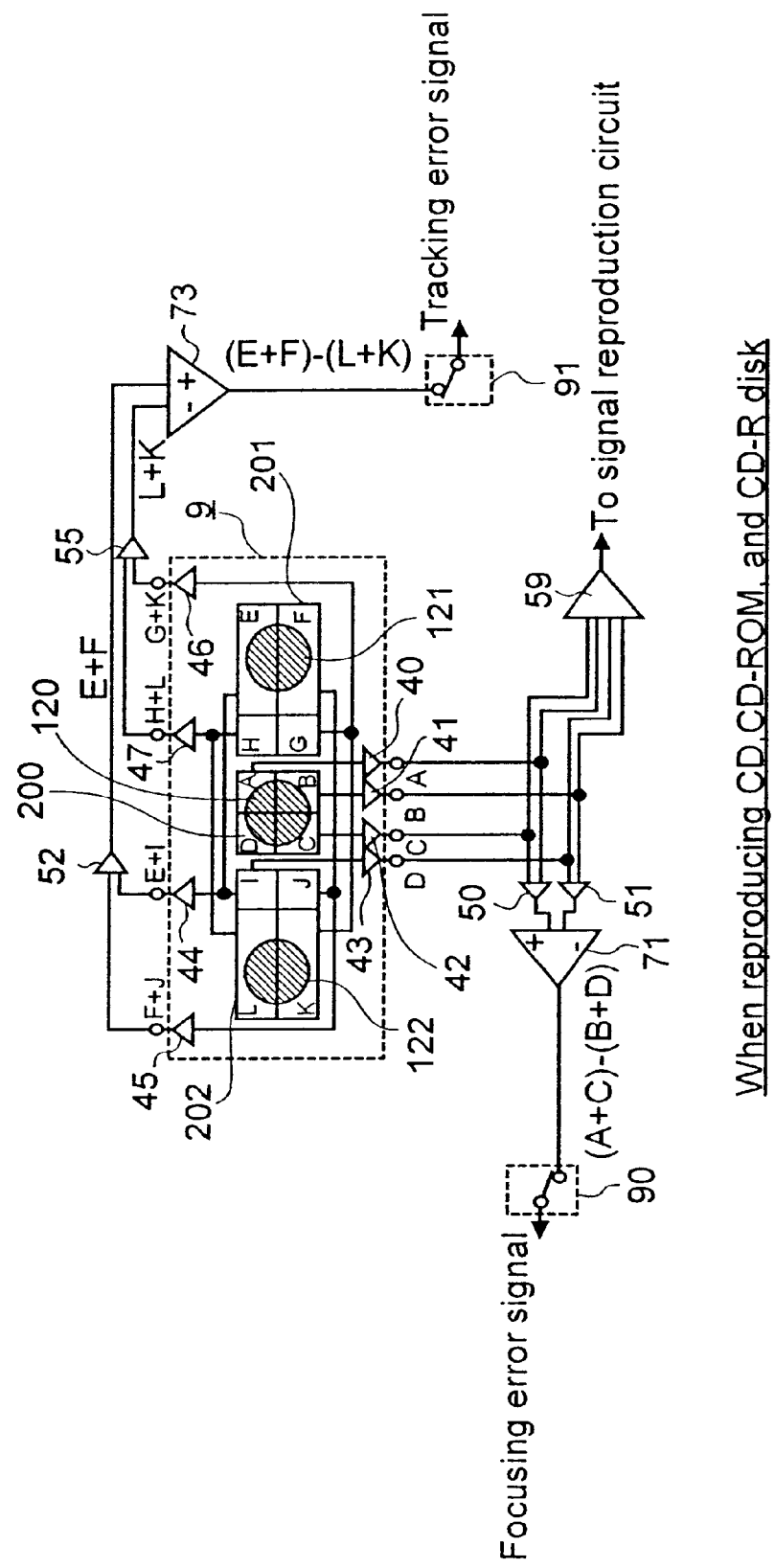
FIG. 13 is a schematic diagram showing an optical detector and signal processing circuit of the third example, when reproducing information from a CD, CD-ROM and CD-R.

Such arrangement of two spots of detected light makes it possible to select a respective focusing error signal detection method and a tracking error signal detection method which are respectively suitable for reproducing a DVD disk and for reproducing a CD. When reproducing a DVD-RAM disk and a DVD-ROM disk, the same detection method is used as in the first example explained with reference to FIG. 5 through FIG. 7. When reproducing a CD, etc., an ordinary astigmatic detection method is used for detecting a focusing error signal, and a three spot method, that will be explained below, is used for detecting a tracking error signal by operating the change switches 90 and 91 shown in FIG. 13. The output signal from adder 52 is the sum of (E+I) and (F+J) output from optical detector 9. But, when reproducing a CD, the actual output signal comes to (E+F) because the detected light spot 122 is not irradiated on light receiving sub-areas I and J. Signal E+F represents all optical quantities of the detected optical spot 121. The actual output signal from adder 55 is (L+K) likewise, and it represents all optical quantities of detected optical spot 122. The optical spots 101B and 102B that correspond to detected light spots 121 and 122, respectively deviate by almost ¼ of a record track pitch TP3 from the central optical spot 100B in the tracking direction as explained with reference to FIG. 11. Subtracter 73 subtracts the output signal of adder 55 from that of adder 52 and outputs (E+F)−(L+K), as explained with reference to FIG. 13. This signal (E+F)−(L+K) is a positive tracking error signal employed by a conventional three spot detection method. This three spot method is a tracking error signal detection method that is very steady and highly efficient when reproducing a conventional read-only disk.

The optical detector and the signal processing circuit of the present invention can realize an optical disk apparatus with high versatility capable of reproducing a variety of disks, including high density optical disks, such as DVD-RAM and DVD-ROM disks, and conventional disks, such as CD, CD-ROM, CD-R disks, using a simple structured optical head on which two semiconductor lasers, one or two objective lenses and one optical detector are mounted.

Figure 14:
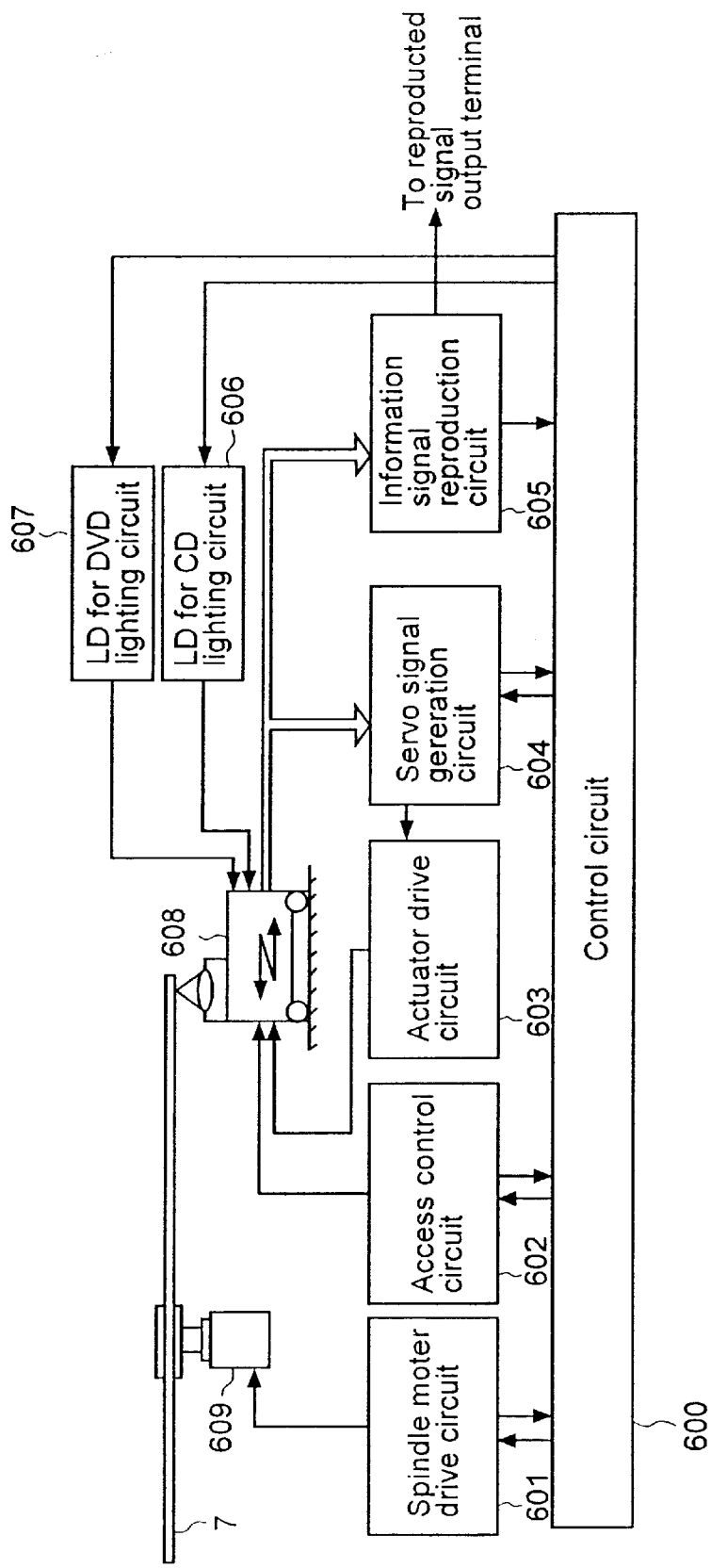
FIG. 14 is a block diagram showing an optical information reproducing apparatus of the present invention.

A block diagram of the optical information reproduction apparatus of a present invention is shown in FIG. 14. Various signals detected by optical head 608 are sent to servo signal generation circuit 604 and information signal reproducing circuit 605 in the signal processing circuit. A focus error signal and a tracking error signal that are suitable for each disk are generated by these detected signals in servo signal generation circuit 604. The actuator drive circuit drives an objective lens actuator in optical head 608 in response to the focus error signal and the tracking error signal and control the position of an objective lens. The information signal reproducing circuit reproduces an information signal recorded in the disk from the signals detected by the optical head 608. Part of the signals obtained by said servo signal generation circuit 604 and information signal reproducing circuit 605 are sent to control circuit 600. On the basis of these signals, the control circuit 600 distinguishes the kind of optical disk 7 that is going to be reproduced. According to the result of this judgment, the control circuit selects one of the LD lighting circuit 607 for DVD or LD lighting circuit 606 for a CD drive, selects a servo signal detection method suitable for the kind of disk and changes the servo signal generation circuit as mentioned above.

As described herein, a good focusing error signal in which disturbances are almost perfectly deleted (while the amplitude is double) is obtained, and a good tracking error signal in which offset is almost perfectly deleted is obtained by the present invention. Therefore, the present invention can realize an optical disk apparatus with high generality which is able to reproduce a variety of high density optical disks, such as DVD-RAM and DVD-ROM disks, and conventional disks, such as CD, CD-ROM, CD-R disks, by using a simple optical head composed of a few parts.

What is claimed is:
1. An optical pickup comprising:
   a semiconductor laser which emanates an optical beam;
   an optical dividing element which divides the optical beam into at least three optical beams, the at least three optical beams including 0 order light and ±1st order diffraction light;

an optical lens which irradiates optical spots of the three optical beams on an optical disk; and an optical detector which has a first receiving area which receives 0 order light reflected by the optical disk, a second receiving area which receives ±1st order diffraction light reflected by the optical disk and a third receiving area which receives −1st order diffraction light reflected by the optical disk, the second and the third receiving areas being divided into four light receiving surfaces delimited by a first direction corresponding to a radius direction of the disk and a second direction corresponding to a track direction of the disk, the optical detector providing an output of a sum signal of an output from the light receiving surfaces of the second and the third receiving areas which are located at corresponding positions with respect to both of the first and the second directions.

2. An optical pickup according to claim 1, wherein the optical detector comprises an electric current-voltage conversion amplifier which converts a signal electric current of the sum signal into a signal voltage.

3. An optical pickup according to claim 1, wherein the first receiving area is divided into four light receiving surfaces, each of the four light receiving surfaces outputting a signal outside of the detector.

4. An optical pickup comprising:

a semiconductor laser;

an diffraction grating that divides an optical beam from the semiconductor laser into at least three optical beams, the at least three optical beams including 0 order light and ±1st order diffraction light;

an optical lens that irradiates optical spots of the three optical beams on an optical disk; and an optical detector that detects the three optical beams reflected by an optical disk; and wherein the optical detector has a first receiving area which receives reflected 0 order light, a second receiving area which receives reflected +1st order diffraction light and a third receiving area which receives reflected −1st order diffraction light, the second and the third receiving areas being divided into four light receiving surfaces delimited by a first direction corresponding to a radius direction of the disk and the second direction which is substantially perpendicular to the first direction; and an output line which connects an output signal line from a light receiving surface of the second receiving area with an output signal line from a light receiving surface of the third receiving area, the light receiving surface of the third receiving area being located at a corresponding position in both of the first and the second directions to the position at which the light receiving surface of the second receiving area is located.

5. An optical pickup comprising:

an optical system which irradiates optical spots of at least three optical beams on an information recording medium, the three optical beams including 0 order light and ±1st order diffraction light;

an optical detector which has a first receiving area which receives reflected 0 order light, a second receiving area which receives reflected +1st order diffraction light and a third receiving area which receives the reflected −1st order diffraction light, the second and the third receiving areas being divided into four light receiving surfaces delimited by a first direction corresponding to a radius direction of the information recording medium and a second direction corresponding to a track direction of the information recording medium; and an output line which connects output signal lines from the light receiving surfaces of the second and the third receiving areas which are located at corresponding positions in both of the first and the second directions;

wherein the output line is used for detecting both of a focus error signal and a tracking error signal.

6. An optical pickup according to claim 5, wherein the output line is used both for detecting a focus error signal by an astigmatic detection method and for detecting a tracking error signal by a differential push-pull method.

7. An optical pickup according to claim 5, wherein the output line is selectively used for detecting both of a focus error signal and a tracking signal.

8. An optical pickup comprising:

an optical system which irradiates optical spots of at least three optical beams on an information recording medium, the three optical beams including 0 order light and ±1st order diffraction light;

an optical detector which has a first receiving area which receives reflected 0 order light, a second receiving area which receives reflected +1st order diffraction light and a third receiving area which receives the reflected −1st order diffraction light, the second and the third receiving areas being divided into four light receiving surfaces delimited by dividing lines extending in a first direction corresponding to a radius direction of the recording medium and in a second direction corresponding to a track direction of the recording medium; and an output line for outputting a sum signal of an output from a light receiving surface of the second receiving area with an output from a light receiving surface of the third receiving area, the light receiving surface of the third receiving area being arranged in the same direction from an intersection of the dividing lines of the third receiving area as a direction in which the light receiving surface of the second receiving area is arranged from an intersection of the dividing lines of the second receiving area.

9. An optical detector according to claim 8, wherein the sum signal is used both for detecting a focus error signal by an astigmatic detection method and for detecting a tracking error signal by a differential push-pull method.

10. An optical detector according to claim 8, wherein the sum signal is selectively used for detecting both of a focus error signal and a tracking signal.

11. An optical pickup comprising;

an optical system which irradiates optical spots of at least three optical beams on an information recording medium, the three optical beams including 0 order light and ±1st order diffraction light; and an optical detector which has a first receiving area which receives reflected 0 order light, and a second receiving area which receives reflected +1st order diffraction light and a third receiving area which receives reflected −1st order diffraction light, the second and the third receiving areas being divided into four light receiving surfaces delimited by a first direction corresponding to a radius direction of the recording medium and a second direction which is substantially perpendicular to the first direction;

wherein each light receiving surface of the second and the third receiving areas located in the same direction from a center of a respective receiving area is connected to one another, and the connected light receiving surfaces are connected so as to output a sum signal.

12. An optical detector for detecting at least three optical beams reflected by an optical disk, the three optical beams are 0 order light and ±1st order diffraction light, comprising:
a first receiving area which receives reflected 0 order light;
a second receiving area which receives reflected +1st order diffraction light and a third receiving area which receives the reflected −1st order diffraction light, the second and the third receiving areas being divided into four light receiving surfaces delimited by a first direction corresponding to a radius direction of the disk and a second direction corresponding to a track direction of the disk; and
wherein the optical detector outputs outside of the optical detector a sum signal of an output from the light receiving surfaces of the second and the third receiving areas which are located at corresponding positions in both of the first and the second directions.

13. An optical detector according to claim 12, further comprising an electric current-voltage conversion amplifier which converts a signal electric current of the sum signal into a signal voltage.

14. An optical detector according to claim 12, wherein the first receiving area is divided into four light receiving surfaces, each of the four light receiving surfaces outputting a signal outside of the detector.

15. An optical detector according to claim 12, wherein the sum signal output from the optical detector is used for detecting both of a focus error signal and a tracking error signal.

16. An optical detector for detecting at least three optical beams reflected by an optical disk, the three optical beams including 0 order light and ±1st order diffraction light, comprising:
a first receiving area which receives reflected 0 order light, a second receiving area which receives reflected +1st order diffraction light and a third receiving area which receives reflected −1st order diffraction light, the second and the third receiving areas being divided into four light receiving surfaces delimited by a first direction corresponding to a radius direction of the disk and a second direction which is substantially perpendicular to the first direction; and
an output line which connects output signal lines from the light receiving surfaces of the second and the third receiving areas which are located at corresponding positions in both of the first and the second directions.

17. An optical detector which detects at least three optical beams reflected by an optical disk, the three optical beams including 0 order light and ±1st order diffraction light, comprising:
a first receiving area which receives reflected 0 order light, a second receiving area which receives reflected +1st order diffraction light and a third receiving area which receives reflected −1st order diffraction light, the second and the third receiving areas being divided into four light receiving surfaces delimited by dividing lines extending in a first direction corresponding to a radius direction of the disk and in a second direction corresponding to a track direction of the disk; and
an output line for outputting a sum signal obtained by connecting an output from a light receiving surface of the second receiving area with an output from a light receiving surface of the third receiving area;
wherein the light receiving surface of the third receiving area is arranged in the same direction from an intersection of the dividing lines of the third receiving area as the direction in which the light receiving surface of the second receiving area is arranged from an intersection of the dividing lines of the second receiving area.

18. An optical detector which detects at least three optical beams reflected by an optical disk, the three optical beams including 0 order light and ±1st order diffraction light, comprising:
a first receiving area which receives reflected 0 order light; and
a second receiving area which receives reflected +1st order diffraction light and a third receiving area which receives reflected −1st order diffraction light, the second and the third receiving areas being divided into four light receiving surfaces delimited by a first direction corresponding to a radius direction of the disk and a second direction which is substantially perpendicular to The first direction;
wherein each light receiving surface of the second and the third receiving areas which is located in the same direction from a center of a respective receiving area thereof is connected to one another, and the connected light receiving surfaces are connected so as to output a sum signal.

* * * * *